United States Patent [19]
Hovance

[11] Patent Number: 4,817,922
[45] Date of Patent: Apr. 4, 1989

[54] AIRSPRING HEIGHT SENSOR

[75] Inventor: Hubert T. Hovance, Ravenna, Ohio

[73] Assignee: The Goodyear Tire & Rubber Company, Akron, Ohio

[21] Appl. No.: 111,896

[22] Filed: Oct. 23, 1987

[51] Int. Cl.⁴ .................... F16F 9/04; B60G 17/04
[52] U.S. Cl. ..................... 267/64.21; 267/64.27; 267/64.28; 280/707; 280/711; 280/840
[58] Field of Search ............ 267/64.21, 64.16, 64.27, 267/64.11, 64.28, 122, 123; 356/4, 5, 373, 375; 280/6.1, 6 R, 702, 703, 707, 711

[56] References Cited

U.S. PATENT DOCUMENTS

| | | | |
|---|---|---|---|
| 4,027,970 | 6/1977 | Misek | 356/4 |
| 4,518,254 | 5/1985 | Penny et al. | 356/4 |
| 4,527,896 | 7/1985 | Irani et al. | 356/43 |
| 4,569,581 | 2/1986 | Sato | 355/3 BE |
| 4,586,728 | 5/1986 | Tokunaga et al. | 280/707 |
| 4,600,215 | 7/1986 | Kuroki et al. | 280/707 |
| 4,609,944 | 9/1986 | Nakada et al. | 358/228 |

FOREIGN PATENT DOCUMENTS 2177475  1/1987  United Kingdom ............ 267/64.27

Primary Examiner—Andres Kashnikow
Assistant Examiner—Mark T. Le
Attorney, Agent, or Firm—M. R. Dion, Sr.

[57] ABSTRACT

An airspring height control device is based on an infrared light emitting diode and photo transistor receiver combination to reflect a signal from a reflector located internally to an airspring. The variable output signal given off by the receiver is proportional to the distance from the transmitter/receiver to the reflector thus allowing a height controlling mechanism to respond to the signal and make the necessary adjustments.

27 Claims, 3 Drawing Sheets

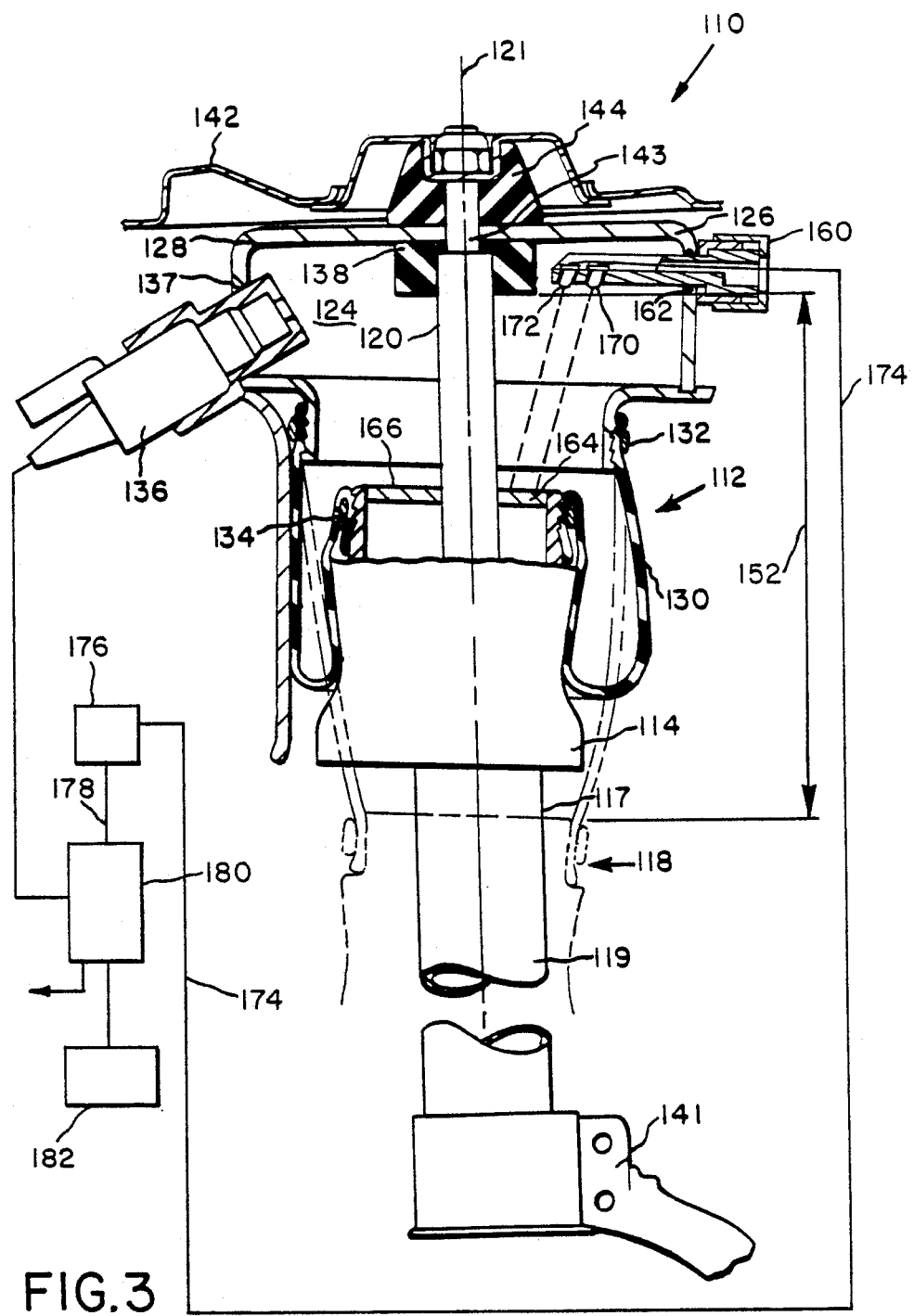

AIRSPRING HEIGHT SENSOR

FIELD OF THE INVENTION

This invention relates to an optical sensor for selectively controlling the relative height of an air suspension system, particularly relating to automotive suspensions employing an airspring as a primary support for the sprung portion of the suspension.

BACKGROUND OF THE INVENTION

In automotive suspension technology it is currently desirable to have the ability to change the height of the body relative to the road depending upon the travel conditions. It is highly desirable to be able to lower the aerodynamic profile of the automobile at high speeds on smooth roads while still being able to raise the sprung portion of the automobile to a much higher level for low speed rough road travel. While it has long been known that the height of the suspension can be adjusted by increasing the pressure in an air adjustable shock absorber in order to increase height such adjustments can only be made manually with the vehicle stopped. In order to continuously make such adjustments, it is necessary for an automatic system to be able to detect the existing height condition of the vehicle and compare it to a standard or to a selected height. Any mechanical systems for measuring the distance between two points of the suspension which are relatively movable to each other as the body is raised and lowered have inherent reliability problems during the long service lives of such suspension members.

It is an object of this invention to develop a low cost infrared height sensor which is small in size and may permit installation within the air suspension system. A further objective is to allow the driver to electronically select among an infinitely variable number of height adjustments while the vehicle is in motion. It is the further object to allow for the replacement of the infrared height sensing device without disassembly of the strut or suspension unit in which it is mounted. A still further object is for the height sensor to be capable of withstanding the environment of the suspension over a temperature range of −40° to 100° C. All objectives are achieved utilizing an infrared height sensing system which is mounted within an air suspension member. The air suspension member remains capable of reliable and consistent control of vehicle height throughout the environmental range of conditions to which automobiles are subjected.

BRIEF DESCRIPTION OF THE INVENTION

The objectives previously stated can be achieved utilizing an airspring height control device comprising:
 (a) an infrared light emitting diode transmitter capable of emitting light of a given wavelength;
 (b) a photo transistor receiver adjacent to said transmitter capable of detecting said light and sending a variable output signal;
 (c) a reflector movably located at a distance from said transmitter and receiver to reflect the emitted light from the transmitter back to the receiver;
 (d) means for translating said variable output signal to provide an interface with a height controlling mechanism; and
 (e) a height controlling mechanism capable of controlling the distance between said reflector and the transmitter/receiver.

There is also disclosed an airspring with an internal height sensor and a pair of rigid members comprising:
 a rigid piston;
 a rigid upper retainer;
 a flexible membrane sealingly attached to said piston and said upper retainer to form a working cavity therebetween;
 a means for sensing the relative vertical distance between said piston and said upper retainer, said means for sensing including an infrared light emitting diode transmitter attached to one of said rigid members and capable of emitting radiation of a given wavelength, a photo diode receiver positioned within receiving range of said infrared light emitting diode transmitter capable of sensing the radiation of said given wavelength and providing a variable output signal, a reflector positioned on said second rigid member within a line of sight of said transmitter, a means for comparing said variable output signal with a predetermined height range, a means for controlling the relative distance between said piston and said upper retainer.

BRIEF DESCRIPTION OF THE DRAWING

FIG. 3 shows an alternative embodiment of the invention in which the height sensor is mounted within an air suspension strut.

DETAILED DESCRIPTION OF THE INVENTION

Figure 1:
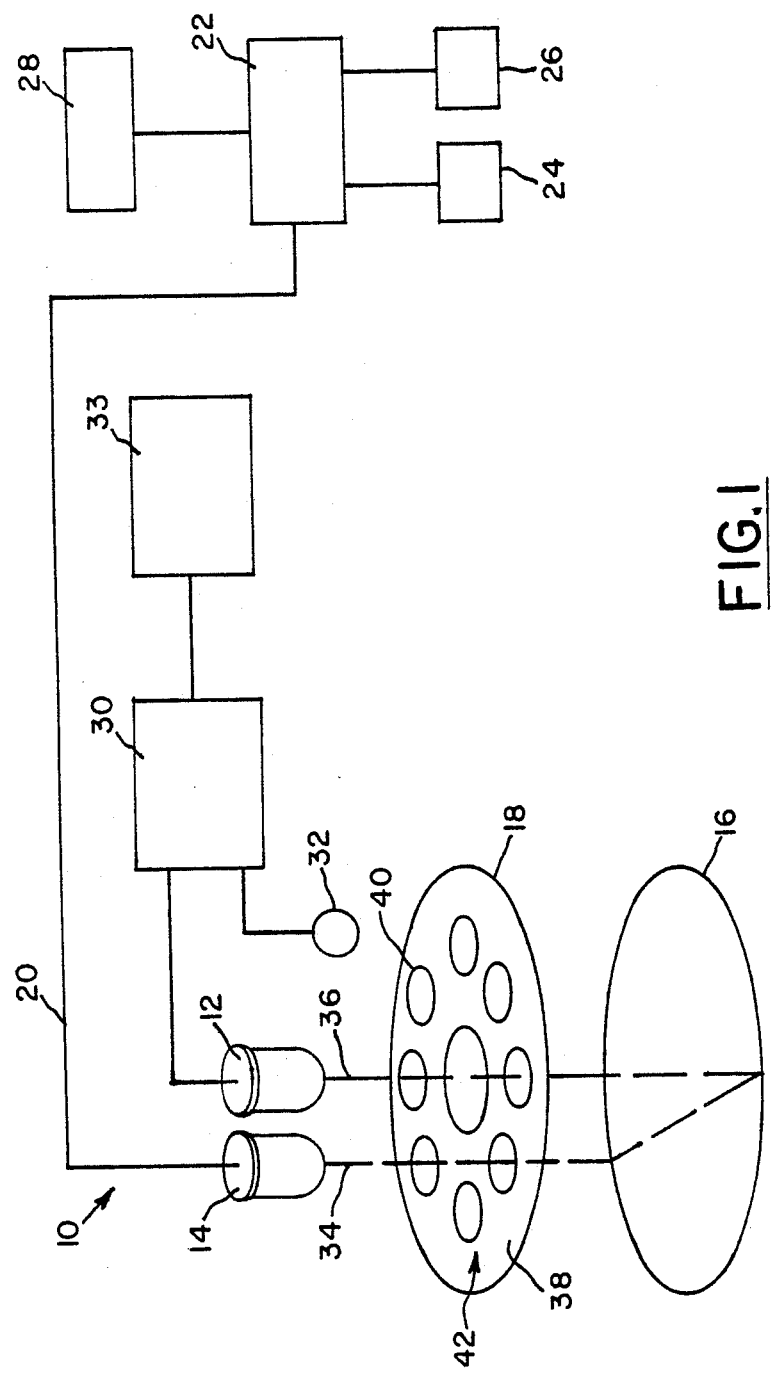
FIG. 1 is a simplified schematic of the essential elements of the infrared sensor system utilized for automotive height control of a suspension system.

FIG. 1 schematically shows the central physical elements of the infrared height sensor without reference to any particular device in which it is being used. The height sensor 10 is composed of an infrared transmitter 12 and a infrared receiver 14. The transmitter 12 provides an infrared beam directed at a reflector 16 which returns a portion of the infrared beam from the transmitter 12 to the receiver 14. A mask 18 is shown interposed between the transmitter/receiver and the reflector. The mask will be discussed in considerable detail subsequently.

FIG. 1 also schematically shows a diagram describing the upstream and downstream electronics for providing height control in the device. These functions are shown only in a very simplified schematic form. The variable output signal 20 from the receiver 14 is routed to a receiver control circuit 22 which conditions, amplifies and provides an interface for the appropriate control devices 24 and 26 for raising or lowering respectively the height of the device in which the height sensor 10 is installed. A variable height set point 28 is provided as additional input into the receiver control circuit 22. The infrared transmitter 12 has a control module 30 which may include an optional compensation device 32 for various external conditions, including temperature, atmospheric pressure, etc. An external input to the transmitter control 30 is the height adjustment module 33 which controls the output of the transmitter 12. The height sensor device 10 operates by optically coupling the infrared receiver 14 with the infrared transmitter 12 via the reflector 16. The transmitter 12 and receiver 14 are positioned within a single rigid unit such that the infrared light leaves the transmitter and is reflected back to the adjacent receiver 14. With a properly designed reflector, the amount of infrared radiation reflected back to the receiver 14 will be directly proportional to the distance between the reflector and the transmitter/receiver sensing unit. As the target area on which the reflector 16 is mounted moves closer to the transmitter/receiver assembly, a greater percentage of the transmitted infrared light is returned to the receiver 14 thereby providing a greater signal output 20 from the receiver.

The transmitter is preferably an infrared light emitting diode (LED) transmitter, such infrared diode transmitters are well known although not for use in devices such as airsprings. Other LED transmitters may be suitable for use in this invention and no attempt will be made here to list the various types which may have utility, one of ordinary skill in the art of infrared transmission and detection will be aware of the evolution and suitability of various products. The essential requirement of the transmitter 12 is that it provide a constant output of infrared radiation of a given frequency and wavelength over a suitably long life. A most preferred infrared light emitting diode type is a gallium aluminum arsenide (GaAlAs) infrared type which has a high radiation output at a given forward current. A commercially available example is the OP260SLA available from the Optoelectronics Division of TRW Electronic Components Group of Carrolton, Tex. Gallium arsenide emitters are also a preferred type. Compensation circuits for adjusting for varying output over the life of the transmitter as well as temperature and environmental compensation circuits will be described in detail later.

The infrared receiver 14 may be any device capable of receiving variable inputs of infrared radiation of a given wavelength and frequency. The most suitable devices known at this time are photo transistor receivers.

A most preferred type is a photodarlington transistor. A broader preferred class is a transimpedence amplifier with parallel feedback. At the present time a particularly suitable receiver is an NPN silicon photodarlington, type OP530, available from Optoelectronics Division of TRW Electronic Components Group. The photodarlington offers the advantage over conventional photo transistors of providing high current gains under low signal light levels.

The infrared transmitter 12 and receiver 14 must be precisely and properly aligned relative to each other. It is felt at this time that moving the centerlines of the transmitter and receiver as close together as possible is a desired configuration. The receiver centerline 34 and the transmitter centerline 36 are shown in parallel orientation. It is noted that for many applications it may be highly desirable to have the centerlines 34 and 36 angularly positioned relative to each other. When the receiver 14 and transmitter 12 are placed physically very close together it is important that one be shielded from the other to prevent unwanted radiation leakage from the transmitter to the receiver which has not traveled to the reflector and back. Such installation and orientation of the components of the sensor are known to one of ordinary skill in the art and will not be discussed in further detail. The potting materials used to secure the receiver and transmitter into an integral unit must be capable of withstanding the environment including temperature, humidity and various contaminants which may be present in the working environment.

The reflector 16 is a critical element of the height sensor 10 operation and the reflector may be mounted either on the moving component of the device or on the fixed component depending on the various design criteria. The reflector must be capable of providing constant reflectivity of the infrared wavelength being utilized despite the presence of various contaminants. In some circumstances a highly machined metal surface may be suitable, but in most applications a special reflector should be provided with special consideration given to the environment in which the reflector is being utilized. The reflector may have reflective paint placed on the reflective surface or it may be a separate laminate or film which is applied to the work surface to form the reflector 16. The reflector should be capable of reflecting back nearly all of the radiation which impinges on its surface without absorbing any substantial amount. One particularly suitable material is a product manufactured by the Minnesota Mining and Manufacturing Company and marketed under the product designation 3M Scotchlite TM, High Contrast #7615 Sheeting. This retro-reflective sheeting has a dispersion angle of 20° of the transmitted centerline. Other high reflectivity surfaces would be suitable. The size of the reflector 16 is determined experimentally by the nature of the movement between the fixed and moving surface of the device in which the height sensor is installed, but generally a large enough target area must be provided by the reflector 16 to assure a smooth, controllable return signal to the receiver 14 from the transmitter 12.

Contamination such as oil, dust, water, various other solids and fluids cause difficulty with the consistency of reflectivity of the reflector 16. These contaminants must be taken into consideration in selecting the reflective material for a particular application. It should be noted that even simple condensation of water over the surface of a reflector may render the reflective material dead or incapable of returning the incoming radiation. A protective mask 18 may be utilized to advantage in many applications for the dual purpose of protecting the reflector 16 from contamination as well as providing a matrix for varying the reflectivity of the reflector over its surface. As to the contamination protection, the mask may be made from any suitable material which has the appropriate transparency in the desired infrared frequency range. Materials which may be suitable for the mask include polycarbonate, polyester, polyvinyl chloride or acrylic films. The photo mask may include a matrix 38 on its surface of open transparent areas 40 interspersed with opaque areas 42 in a desired pattern. When such a matrix 38 is provided on a protective film laminate the mask will be described as a photo mask. The matrix 38 of open transparent areas 40 and opaque non-reflective areas 42 may be provided using photographic techniques for exposing and altering the surface of the mask 18 to selectively alter the reflectivity of the surface. Many forms of the matrix may be utilized and depending upon the variability of the orientation of the reflector 16 to the centerlines 34 and 36 of the receiver 14 and transmitter 12, the matrix 38 may be varied in order to provide a desired output as the reflector moves toward the receiver 14. A series of concentric rings is the most preferred form of mask 18.

It is to be noted in working configurations that several transmitters 12 may be positioned around a single receiver in order to augment the signal being received.

The individual receivers and transmitters are preferably encapsulated in optically clear plastic or other suitable potting material. The transmitters should be shielded to prevent unwanted cross talk or radiation which moves directly from the transmitter to the receiver without having been reflected back from the reflector 16. The materials and designs for the infrared sensor are dependent upon the environment and the specific design requirements of the application.

Figure 2:
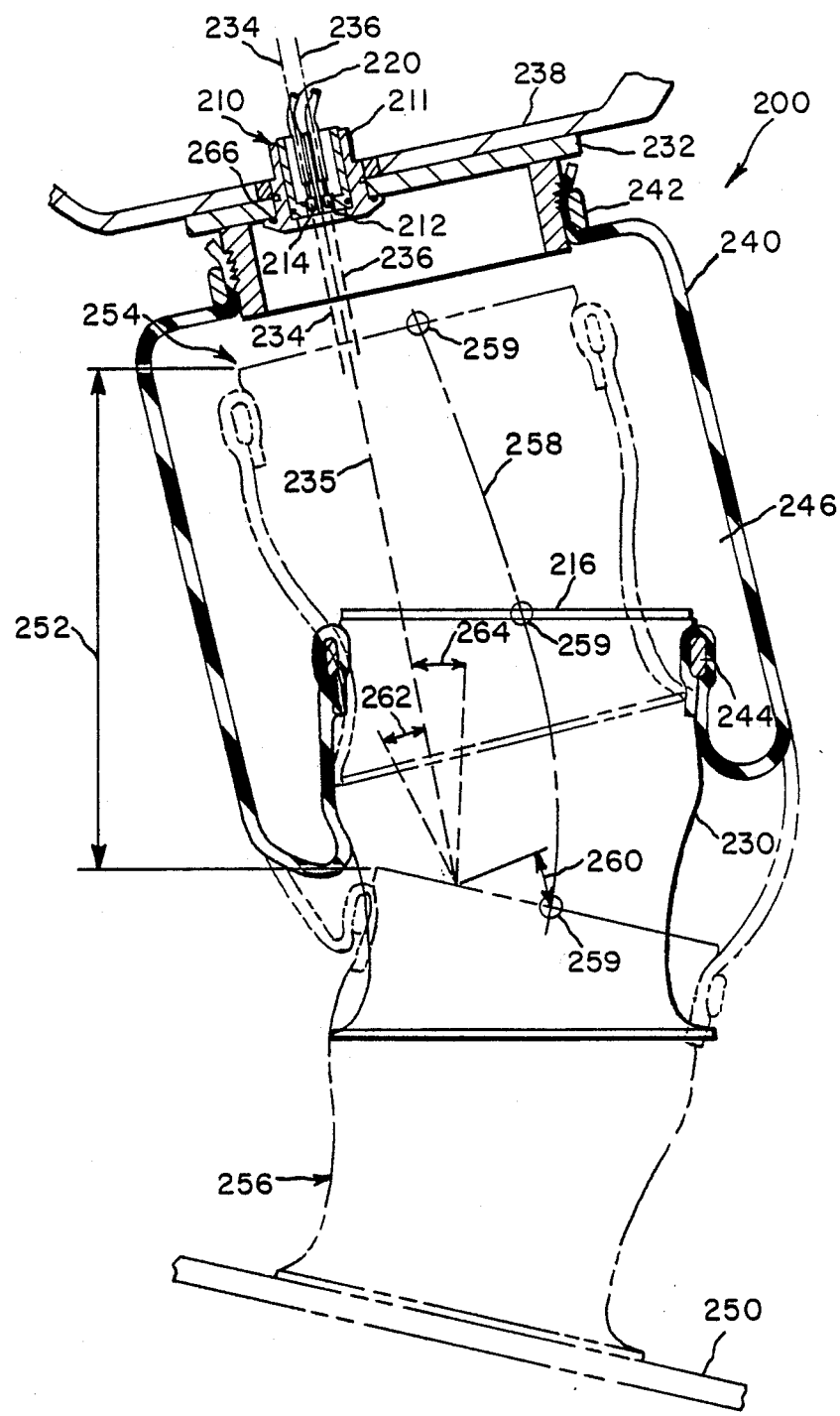
FIG. 2 shows the height sensor of FIG. 1 mounted within a rolling lobe airspring.

FIG. 2 shows a conventional rolling lobe airspring 200 fitted with the unique height sensor 210 of the invention. The height sensor has a sensor unit 211 containing within it the infrared transmitter 212 and the infrared receiver 214 all of which are similar in character to the similarly named components described in FIG. 1. The reflector 216 is positioned on the piston 230 of the airspring 200. The reflector 216 is on the surface of the piston 230 which is essentially perpendicular to the centerlines 234 and 236 of the receiver and transmitters 214 and 212 respectively. For simplicity of illustration, the centerline 235 is illustrated which represents the geometric center of the sensor 210. The airspring includes two rigid components, the first is the piston 230 which, in this configuration, is movable and the upper retainer 232 which in this configuration is rigidly fixed to a frame 238, a flexible membrane is provided 240 which is air tightly affixed around the upper retainer 232 and around the piston 230 by retaining rings 242 and 244 to establish a fluid tight working cavity 246 between the rigid elements of the airspring and the flexible membrane 240. The working cavity 246 can be pressurized with an appropriate fluid including air, hydraulic fluid, ethylene glycol, etc. The airspring 200 is presumed for the purposes of FIG. 2 to be a portion of a automotive suspension member wherein the upper retainer 232 is attached to the sprung portion of the automobile which is represented by the frame element 238. The piston 230 is attached to the unsprung portion 250 of the vehicle. The sprung and unsprung portions of the vehicle move relative to one another during vehicular service and as a result the piston 230 moves with respect to the upper retainer over the working stroke 252 of the airspring. The position shown where the piston is nearly adjacent to the upper retainer is called the full jounce position 254 and the full jounce position is shown in phantom lines, the full rebound position 256 is also shown in phantom lines where the piston has moved away from the upper retainer 232. An important phenomenon must be observed about the movement of the airspring 200 within a suspension member. Namely, any point on the piston surface moves in a generally arcuate path relative to a given point on the upper retainer. This is due to the angular geometry of most automotive suspension members and is a critical design problem for an internally positioned sensor which must be capable of sensing the position of the piston despite its angular as well as vertical displacement away from the fixed member. The arcuate path is designated as 258 in FIG. 2. The point being traced from one end of the arcuate path 258 to the other end is the centerpoint 259 of the reflector 216. The output signal 220 coming from the receiver 214 must be proportional to the vertical travel of the piston relative to the upper retainer despite the arcuate movement shown by the path 258. The unique characteristics of the infrared sensor 210 lends itself to an accurate, reproducible, continuously-variable output 220 which describes the exact positioning of the piston. Herein lies a major advantage of the infrared sensor system of the invention as it is used in a automotive suspension system.

The ability of the sensor to accurately measure the distance of the piston from the upper retainer is dependent on the accuracy of the reflective energy being returned to the receiver. The optimum geometric condition is one in which the centerline 235 of the sensor is normal to the plane of the reflector 216. Since the reflector in this embodiment is placed upon the upper surface of the piston, the centerline 235 is normal to the top of the piston. However, due to the arcuate path 258 which the piston follows over the full stroke 252 of the airspring it is not possible for this optimal condition of normal orientation to the reflector be maintained. By a proper selection of the efficient reflector 216, sufficient feedback to the receiver can still be obtained up to the point where the piston is angled such that it is within 20°-30° of the centerline 235. This angle 260 may range between +30° and −30° although it is felt that by proper selection of materials and by maintaining sufficiently strong output from the transmitter, angles even greater than 30° may be workable. All reflective surfaces have a tendency to disperse the impinging radiation by a characteristic amount. Dispersion angles 262 and 264 are shown to illustrate that dispersion.

The body of the sensor 211 must protrude into the working cavity 246 through one of the rigid members, either the upper retainer 232 as shown in FIG. 2 or in other designs it may be positioned by the piston. Since the working cavity is a pressurized fluid cavity it is necessary that the body 211 be sealed to assure that air or fluid tightness is maintained. O-rings 266 are positioned between the upper retainer 232 and the body 211 of the sensor 210 in order to insure an airtight seal.

FIG. 3 illustrates the height sensor of the invention utilized in an automotive strut application. The air suspension strut 110 is shown utilizing an airspring 112 having a piston 114 and an upper retainer 126. The upper retainer 126 of the airspring is integral with a volume can 128 which is a rigid structure to which the flexible air impervious membrane 130 can be sealably attached utilizing swage ring 132. The flexible member 130 is also sealably attached on its opposite end to the upper portion of the piston 114 by swage ring 134 thereby establishing the enclosed volume of the working cavity 124.

The piston 114 is mounted on the tubular body 117 of the damper means 118. Damper means 118 is a conventional shock absorber 119 filled with a damping medium such as hydraulic fluid or oil. The rod 120 is axially movable within the outer body 117 and is connected to the damping medium through an axially movable piston. The axis 121 of the strut is also defined to be the axis of the rod and damper means. In this strut configuration the piston 114 is fixedly and air tightly fastened to the tubular body 117 of the shock absorber 119. Air suspension members such as 110 are generally fitted with a suitable means for changing air pressure within the working cavity 124. FIG. 3 illustrates a pneumatic valve 136 inserted through an opening 137 in the wall of the volume can 128 to allow the inlet and exhaust of compressed air during operation of the air suspension system 110. Variation of the internal working pressure of the working cavity 124 effects a change in desired height of the strut due to movement of the piston 114 away from the upper retainer 126. The damper means 118 is connected to the unsprung portion of the suspension by a suitable attachment means shown by the bracket 141. The upper retainer 126 and the rod 120 are connected to the sprung portion 142 of the suspension at an attachment point 143. The resilient mount 144 isolates the high frequency low amplitude movements of the rod 120 from the upper retainer 126 thereby isolating the sprung portion 142 from these undesirable high frequency low amplitude variations. A jounce bumper 138 is provided for the circumstance in which the piston reaches its full jounce travel at the upper end of the working stroke 152. The jounce bumper 138 cushions the piston and prevents physical damage to the upper retainer in the full jounce position.

An infrared height sensor 160 is air tightly secured into the upper retainer 126 and sealed using O-ring 162. Secured to the top of the piston 114 is a reflector 164 and a mask 166 which are in all respects similar to those described as reflector 16 and mask 18 in FIG. 1. The reflector returns the infrared radiation from the infrared transmitter 170 to the receiver 172 which are securely positioned within the sensor 160. As the piston moves away from the upper retainer the signal from the transmitter is slightly weakened as it returns to the receiver 172 thereby providing a reduced output 174 from the receiver 172. This output is processed by the receiver control circuit 176 which in turn orders the appropriate correction in height to be effected through augmentation or reduction in the amount of air pressure within the working cavity 124. The receiver control circuit sends a signal 178 to a means for varying the pressure within the working cavity such as a two-way valve 180 which either exhausts or inputs air through the pneumatic valve 136 which is sealably positioned in the upper retainer providing a connection between a pressurized gas source 182 and the working cavity 124.

ADDITIONAL EMBODIMENTS

Optional functions which may be included in the optical height sensor system are circuits to control variability of transmitter and receiver output over a wide temperature range. Referring back to the illustrations of FIG. 1, when an infrared light emitting diode transmitter is being used for the transmitter 12 it is characteristic of such an infrared emitter that as ambient temperature rises, the effective output decreases and as ambient temperature falls, the effective output increases. Also, when a photo transistor is used as the receiver 14 the temperature-output characteristics vary oppositely to that just described. That is, as ambient temperature rises, the effective output increases and as ambient temperature falls the effective output decreases. Given this combination it is clear that some adjustment may be necessary when a broad temperature range of for instance 100° C. to −40° C. is utilized. A temperature compensating circuit 32 as shown in FIG. 1 can utilize several different inputs in order to make the appropriate compensation. The simplest is to have a constant base line established by including an extra transmitter 12 which transmits directly to a receiver 14 without reflecting off of the reflector 16. This establishes a base line for comparison of the output being returned from the operational transmitters and receivers through the reflector. The details of such a temperature compensation circuit are well within the skill of one practicing in this art and will not be described in detail.

An alternate preferred compensation circuit utilizes a thermistor made of a semiconductive ceramic material. Proper selection of thermistor characteristics provides a very simple temperature adjustment device. A bead thermistor GB33L1, available from Fenwal® Electronics has been found to be an adequate compensator 32 for temperature.

An especially preferred form of the height sensor 10 is one in which a pair of receivers 14 have clustered around them at least four transmitters 12. One transmitter and one receiver are utilized to establish the base line as just described for the temperature compensation circuit 32. The remaining three transmitters 12 augment the light level to the operational receiver 14 for providing the variable output signal 20.

An additional function which may be easily provided is the ability of the operator of the vehicle to manually select a desired height level for the suspension. The variable height set point 28 shown on FIG. 1 can generally be provided as input to the receiver control circuit 22. It is felt that in high speed operation of the vehicle over relatively smooth roads it may be very desirable to decrease the distance between the piston 114 and the upper retainer thereby lowering the vehicle into a more aerodynamically efficient profile. By contrast at low speed on relatively rough road it may be very desirable to have a much higher height to the suspension to assure good road clearance. Such a function may be provided as an input to the receiver control circuit 22.

What is claimed is:

1. An airspring with an internal height sensor and a pair of rigid members comprising:
    a rigid piston;
    a rigid upper retainer;
    a flexible membrane sealingly attached to said piston and said upper retainer to form a working cavity therebetween;
    a means for sensing the relative vertical distance between said piston and said upper retainer, said means for sensing including an infrared light emitting diode transmitter attached to one of said rigid members and capable of emitting radiation of a given wavelength, a photo diode receiver positioned within receiving range of said infrared light emitting diode transmitter capable of sensing the radiation of said given wavelength and providing a variable output signal, a reflector positioned on said second rigid member within a line of sight of said transmitter, a means for comparing said variable output signal with a predetermined height range, a means for controlling the relative distance between said piston and said upper retainer.

2. An airspring according to claim 1 wherein said means for controlling distance of said piston to said upper retainer includes a means for varying the internal pressure of said working cavity by introducing or exhausting fluid from said cavity.

3. An airspring according to claim 1 wherein said reflector includes a photo mask for selectively modifying the radiation from said transmitter.

4. An airspring according to claim 3 wherein said mask includes a plurality of shaped areas which are transparent to said radiation from said transmitter and the remainder of surface of said mask is opaque to said radiation.

5. An airspring according to claim 1 further comprising a preselected range for said distance between said piston and said upper retainer and a set point being the medial point in said range.

6. An airspring according to claim 5 further comprising a means for varying the set point.

7. An airspring according to claim 1 wherein said transmitter and said receiver are placed adjacent and attached to one rigid member.

8. An airspring according to claim 7 wherein said transmitter has a centerline of transmission and said receiver has a centerline of reception.

9. An airspring according to claim 8 wherein said centerline of transmission and centerline of reception are parallel and adjacent.

10. An airspring according to claim 8 wherein said reflector remains within 30° of perpendicular with respect to the centerline of transmission of the transmitter.

11. An airspring according to claim 1 wherein a defined point on the piston strikes a plurality of arcuate paths over a working stroke of said airspring relative to the upper retainer.

12. An airspring according to claim 4 wherein said plurality of transparent-shaped areas creates a predetermined pattern of reflection which is proportional to the distance between the piston and the upper retainer.

13. An airspring according to claim 4 wherein said mask is a film selected from the group consisting of polycarbonate, polyester, polyvinylchloride and acrylic polymers.

14. An airspring according to claim 13 wherein said film includes the plurality of shaped transparent open areas which are formed by photographically exposing said film to a predetermined pattern.

15. An airspring according to claim 1 wherein said infrared light emitting diode transmitter is a gallium-aluminum-arsenide type diode.

16. An airspring according to claim 15 wherein said receiver is a transimpedence amplifier with parallel feedback.

17. An airspring according to claim 1 further comprising a means for correcting said variable output signal from said receiver to account for temperature variation.

18. An airspring according to claim 1 further comprising a means for compensating for transmitter output variations, which means is a feedback loop which establishes a base line voltage generated by one of a plurality of infrared diodes in said transmitter transmitting directly into the receiver thereby establishing a reference voltage for use as a comparator of the system condition.

19. An airspring according to claim 17 wherein said means for correcting said variable output signal for temperature variation is a thermistor device.

20. An airspring according to claim 1 wherein said is a photodarlington device.

21. An airspring equipped with a height control device comprising:
   a piston spaced from an upper retainer;
   an infrared light emitting diode transmitter mounted at one of said piston and upper retainer and capable of emitting light of a given wavelength;
   a photo transistor receiver adjacent to said transmitter capable of detecting said light and sending a variable output signal;
   a reflector mounted at the other of said piston and upper retainer located at a distance from said transmitter and receiver to reflect the emitted light from the transmitter back to the receiver;
   means for translating said variable output signal to provide an interface with a height controlling mechanism; and
   said height controlling mechanism capable of controlling the distance between said reflector and the transmitter/receiver.

22. The air spring according to claim 21 further comprising a photomask for selectively modifying the light from the transmitter.

23. The air spring according to claim 21 wherein the transmitter is a gallium-aluminum-arsenide type diode and the receiver is a transimpedance amplifier with parallel feedback.

24. The air spring according to claim 23 further comprising a means for compensating for variations of the transmitted light.

25. The air spring according to claim 24 wherein the means for compensating for variations of the transmitted light is a feed back loop which establishes a base line voltage generated by one of a plurality of infrared diodes in the transmitter transmitting directly into the receiver, thereby establishing a reference voltage for use as a comparator of the system condition.

26. The air spring according to claim 23 further comprising a means for compensating for signal variations due to temperature.

27. The air spring according to claim 26 wherein the means for compensation for temperature is a thermistor device.

* * * * *